United States Patent
Zhang et al.

(10) Patent No.: US 12,475,772 B2
(45) Date of Patent: Nov. 18, 2025

(54) LIGHTWEIGHT FIRE SMOKE DETECTION METHOD, TERMINAL DEVICE, AND STORAGE MEDIUM

(71) Applicant: NANJING UNIVERSITY OF POSTS AND TELECOMMUNICATIONS, Nanjing (CN)

(72) Inventors: Dengyin Zhang, Nanjing (CN); Xu Li, Nanjing (CN); Xiaofei Jin, Nanjing (CN); Songhao Lu, Nanjing (CN)

( * ) Notice: Subject to any disclaimer, the term of this patent is extended or adjusted under 35 U.S.C. 154(b) by 279 days.

(21) Appl. No.: 18/469,603

(22) Filed: Sep. 19, 2023

(65) Prior Publication Data
US 2024/0005759 A1  Jan. 4, 2024

Related U.S. Application Data

(63) Continuation of application No. PCT/CN2023/103143, filed on Jun. 28, 2023.

(30) Foreign Application Priority Data

Sep. 9, 2022 (CN) .......................... 202211099669.1

(51) Int. Cl.
*G08B 17/12* (2006.01)
*G06T 7/194* (2017.01)
(Continued)

(52) U.S. Cl.
CPC ............ *G08B 17/125* (2013.01); *G06T 7/194* (2017.01); *G06T 7/70* (2017.01); *G06V 20/52* (2022.01)

(58) Field of Classification Search
CPC . G06T 2207/10016; G06T 7/11; G06T 7/194; G06T 7/70; G06V 10/56; G06V 20/52; G08B 17/125
(Continued)

(56) References Cited

U.S. PATENT DOCUMENTS

2016/0358442 A1  12/2016  Takasu et al.
2018/0108234 A1   4/2018  Cichon
(Continued)

OTHER PUBLICATIONS

Masoom et al. "Early Smoke Detection Based on Improved YOLO-PCA Network", Fire. Mar. 2022, 5:40. doi: 10.3390/fire5020040. (Year: 2022).*
(Continued)

*Primary Examiner* — Kenny A Cese

(57) ABSTRACT

The present invention pertains to the technical field of smoke detection and discloses a lightweight fire smoke detection method, a terminal device, and a storage medium. Primarily, a smoke-like foreground is screened out based on a combination of a mixed Gaussian model and a YUV color model; and an ACON activation function is introduced to replace a Leaky ReLU activation function of YOLOv5 to form an ACON-CSP module for feature extraction. In the present invention, the smoke foreground is extracted for preprocessing by using the combination of the mixed Gaussian and YUV. Thus, in the preprocessing stage, static interference and non-smoke color interference in the preprocessing stage are ruled out while narrowing down the range of smoke detection, ensuring the relative accuracy and improving the detection speed, thereby providing a possible method for fire smoke detection of a low-end terminal device in an outdoor computer.

5 Claims, 6 Drawing Sheets

(51) Int. Cl.
  *G06T 7/70* (2017.01)
  *G06V 20/52* (2022.01)
(58) Field of Classification Search
  USPC .......................................................... 382/103
  See application file for complete search history.

(56) References Cited

U.S. PATENT DOCUMENTS

2019/0304102 A1* 10/2019 Chen ..................... G06T 7/248
2022/0366770 A1   11/2022 Wang

OTHER PUBLICATIONS

Jin et al. "An Improved Mobilenetv3-Yolov5 Infrared Target Detection Algorithm Based on Attention Distillation", International Conference on Advanced Hybrid Information Processing, Springer (2021), pp. 266-279. (Year: 2021).*

Liu S, Feng J, Zhang Q, Peng B. A real-time smoke and fire warning detection method based on an improved YOLOv5 model. In2022 5th International Conference on Pattern Recognition and Artificial Intelligence (PRAI) Aug. 19, 2022 (pp. 728-734). IEEE. (Year: 2022).*

Kosmas Dimitropoulos et al. "Spatio-Temporal Flame Modeling and Dynamic Texture Analysis for Automatic Video-Based Fire Detection", IEEE Trans. Circuits Syst. Video Technol. 2014, 25, 339-351. (Year: 2014).*

Masoom et al. "Early Smoke Detection Based on Improved YOLO-PCA Network", Fire. Mar. 2022, 5:40. (Year: 2022).*

* cited by examiner

LIGHTWEIGHT FIRE SMOKE DETECTION METHOD, TERMINAL DEVICE, AND STORAGE MEDIUM

TECHNICAL FIELD

The present invention pertains to the technical field of smoke detection and relates to a lightweight fire smoke detection method, a terminal device, and a storage medium.

BACKGROUND

Fire is a disaster caused by improper use of fire or spontaneous combustion in nature. If the fire is not controlled in a timely manner, the fire will last for a long time, threatening life in a large region and causing irreversible impact on natural environments. In various natural disasters, fire is one of the most common and frequent disasters that threaten public safety and social development. At the early stage of a fire, smoke is continuously generated and dispersed. If the smoke can be detected promptly and the fire is effectively extinguished at this stage, property loss and social impact can be minimized. Therefore, early smoke detection during a fire is crucial. Conventional smoke detection methods are mostly based on detection technologies of physical sensors, including ion smoke sensors, photoelectric smoke sensors, and the like. However, the physical sensors are not suitable for large-area environments with high or complex sensitivity requirements. Conventional smoke detection apparatuses have a small detection range, are costly, and are easily affected by weather, light, and the like, thereby causing a high false smoke alarm rate.

Currently, the most widely used device for fire detection and alarm is the smoke sensor, which is usually installed in indoor places prone to fire, for example, parking lots, factories, office areas, and homes. The smoke sensor is widely applied by virtue of its low production costs and simple installation. The principle of such detector is to trigger a physical element in the detector to sense the fire based on conditions such as smoke concentration and ambient temperature when a fire occurs, and a change in ambient luminance after the fire becomes greater. An advantage of such detector is that based on conditions such as the change in ambient luminance after the fire becomes greater, the physical element in the detector is triggered to sense the fire. In addition, such detector has no requirement for ambient light, and can even detect the fire and smoke in low-light conditions. However, such detector has great limitations. The detector can detect fires only when the smoke concentration or ambient temperature reaches a certain standard, so it is generally only suitable for small space. In addition, sensitivity of the detector decreases over time, and as a result, the detector cannot detect fires even in the small space. Under impact such as concentration, the transmission speed of a sensor signal is low, and the signal becomes weaker or even invalid, leading to poor recognition performance and high false alarm rate, thereby missing best rescue and firefighting time. There are roughly two research branches: flame detection and smoke detection.

From the perspective of actual use, the technology based on the smoke detection is more advantageous. In the early stage of a file, flames are generally not obvious, especially in densely forested regions where flames are easily obscured. However, smoke generated by fires is easier to be captured by a camera due to its nature of floating upwards and gradually increasing in area. If the smoke can be detected in a timely manner, measures can be taken in advance to control the fire. With development of image recognition technologies and wide application of video surveillance facilities, video-based smoke recognition methods have become a research hotspot among scholars in China and overseas. However, currently, few video surveillance systems or smart terminal devices with smoke detection functions are commercially available. Most smoke detection systems based on in-depth learning are still in the research stage and have not been commercialized. This is mainly because smoke is in a flexible shape and diffuses randomly. There are many smoke-like targets in a smoke-filled spot, making it difficult to locate and detect real fire smoke. Therefore, the inventors propose a lightweight fire smoke detection method, a terminal device, and a storage medium, to resolve the foregoing problems.

SUMMARY

To overcome disadvantages in the prior art, the present invention provides a lightweight fire smoke detection method, a terminal device, and a storage medium, to resolve a technical problem that it is difficult to position and detect real smoke because there are many smoke-like targets in a smoke field.

To achieve the foregoing objectives, the following technical solutions are used in the present invention:

According to a first aspect, the present invention provides a lightweight fire smoke detection method, including the following steps:

obtaining a video image;

screening out a smoke-like foreground based on a combination of a mixed Gaussian model and a YUV color model;

calling an improved yolo algorithm to further screen the smoke-like foreground; and predicting a specific position and range of smoke in each frame of image to complete a smoke detection process.

Based on the first aspect, further, the screening out a smoke-like foreground based on a combination of a mixed Gaussian model and a YUV color model specifically includes:

performing pixel matching on each frame of video by using a mixed Gauss algorithm, to obtain a corresponding static background and dynamic foreground; and determining an area growth rate of the dynamic foreground, and if the area growth rate is greater than 0, extracting the dynamic foreground again based on the YUV color model, to obtain a smoke foreground obtained via coarse screening to finally demarcate a specific position and range of smoke in the video.

Based on the first aspect, further, during the performing pixel matching on each frame of video by using a mixed Gauss algorithm, a weighted sum formula of a Gaussian distribution probability density function is:

$$P(x_t) = \sum_{i=1}^{k} w_{i,t} \cdot \eta(x_t, \mu_{i,t}, \tau_{i,t}) \quad (1\text{-}1)$$

$$\eta(x_t, \mu_{i,t}, \tau_{i,t}) = \frac{1}{|\tau_{i,t}|^{1/2}} e^{-\frac{1}{2}(x_t-\mu_{i,t})^T \tau^{-1}(x_t-\mu_{i,t})}$$

$$\tau_{i,t} = \sigma_{i,t}^2 I$$

where $x_t$ is a pixel in a current frame, k is the total number of Gaussian models, $w_{i,t}$ is weight of the $i^{th}$ Gaussian distribution at a moment t, η is a probability density function of the $i^{th}$ Gaussian distribution at the moment t, $\mu_{i,t}$ and $\tau_{i,t}$ are a mean and a covariance matrix, $\sigma_{i,t}^2$ is a variance, and I is a three-dimensional identity matrix.

Based on the first aspect, further, the method further includes: matching pixels in the current frame with preset mixed Gaussian models one by one until the Gaussian model that suits the pixel is found, as expressed in the following formula:

$$|x_t - \mu_{i,t-1}| \leq D \cdot \sigma_{i,t-1} \quad (1\text{-}2)$$

where D is a confidence parameter and $\sigma_{i,t-1}$ is a standard deviation of the $i^{th}$ Gaussian distribution at the moment t−1; and if a Gaussian distribution matches the pixel successfully, setting $M_{i,t}$ to 1, and updating a parameter in the Gaussian model, as expressed in the following formula:

$$w_{i,t} = (1-\alpha)w_{i,t-1} + \alpha M_{i,t}$$

$$\mu_{i,t} = (1-\rho)\mu_{i,t-1} + \rho x_t$$

$$\sigma_{i,t}^2 = (1-\rho)\sigma_{i,t-1}^2 + \rho(x_t - \mu_{i,t})^T (x_t - \mu_{i,t}) \quad (1\text{-}3)$$

where α is a learning rate and $\rho = \alpha \cdot \eta$ is a parameter update rate; or if the Gaussian distribution does not match the pixel, keeping the mean $\mu_{i,t}$ and variance $\sigma_{i,t}^2$ in Gaussian distribution parameters unchanged, and only changing the weight $w_{i,t}$, where $M_{i,t}$ is 0 in this case; and when none of k Gaussian distributions matches the pixel, creating a new Gaussian distribution to replace a Gaussian distribution with smaller weight in the original distributions, and performing normalization on the parameters; and matching $x_t$ with the obtained B Gaussian models, and when one model satisfies a need of the pixel, treating the pixel as the background, otherwise, treating the pixel as the foreground, as expressed in the following formula:

$$B = \arg \min_{b} \left( \sum_{i=1}^{b} w_{i,t} > T \right) \quad (1\text{-}4)$$

where b is an initial parameter, and T is a preset threshold.

Based on the first aspect, further, during the extracting the dynamic foreground again based on the YUV color model, a formula for switching from RGB color space to YUV color space is as follows:

$$Y = 0.299R + 0.587G + 0.114B$$

$$U = -0.1687R - 0.3313G + 0.5B + 128$$

$$V = 0.5R - 0.4187G - 0.813B + 128 \quad (1\text{-}6)$$

where value ranges of Y and chrominance components U and V are all 0 to 255; and a region that satisfies the following formula is determined as a smoke-like region:

$$I_{color} = \begin{cases} I(x,y) & U(x,y) > T_U \text{ OR } |U(x,y) - V(x,y)| > T_{UV} \\ 0 & \text{Others} \end{cases} \quad (1\text{-}7)$$

where U(x,y) and V(x,y) are a component U and a component V of a point (x,y) respectively.

Based on the first aspect, further, the calling an improved yolo algorithm to further screen the smoke-like foreground specifically includes:

during extraction of a smoke feature, using a preprocessed smoke data set as input of the model, repeatedly training and adjusting a parameter in a mobile-yolov5 model, to finally generate a weight characterizing the smoke feature, and calling the weight for the smoke foreground obtained by coarse screening, to perform secondary fine screening on the smoke region.

Based on the first aspect, further, in the mobile-yolov model, a backbone network of YOLOv5s is replaced with a backbone network of Mobilenetv3, and an SE attention mechanism is added to the backbone network of mobile-yolov5.

Based on the first aspect, further, the method further includes: introducing an ACON activation function to replace a Leaky ReLU activation function of YOLOv5 to form an ACON-CSP module for feature extraction.

According to a second aspect, the present invention provides a terminal device, including a memory, a processor, and a computer program stored in the memory and capable of running on the processor, where when the processor executes the computer program, the fire smoke detection method in any one of solutions in the first aspect is implemented.

According to a third aspect, the present invention further provides a computer-readable storage medium, where the computer-readable storage medium stores a computer program, and when the computer program is executed by a processor, the fire smoke detection method in any one of solutions in the first aspect is implemented.

Compared with the prior art, the present invention implements the following beneficial effects:

The present invention discloses a lightweight fire smoke detection method, a terminal device, and a storage medium. In the present invention, the smoke foreground is extracted for preprocessing by using the combination of the mixed Gaussian and YUV. In the preprocessing stage, static interference and non-smoke color interference are ruled out while narrowing down the range of smoke detection, thereby ensuring the relative accuracy and improving the detection speed greatly.

In the present invention, the lightweight mobile-yolov5 is used to train data and extract a smoke feature; and finally, the data and the smoke feature are fused to predict the specific position and range of the smoke, and the smoke is demarcated to complete the detection of the smoke. Compared with other large-scale convolutional neural networks, the present invention can reduce repetition of gradient information in an optimization process, and adaptively choose whether to activate neurons, which greatly improves network accuracy and can provide a possibility for production of smoke detection products in real life.

DESCRIPTION OF EMBODIMENTS

The technical solutions of the present invention are described in detail below through the accompanying drawings and specific embodiments. It should be understood that the embodiments of this application and specific implementations in the embodiments are intended to describe the technical solutions of this application in detail, rather than limit the technical solutions of this application. In absence of conflicts, technical features of the embodiments and implementations of this application may be combined with each other.

Smoke is in a flexible shape and diffuses randomly. There are many smoke-like objects in the smoke-filled spot, making it difficult to locate and detect real smoke. The smoke region is difficult to screen out, the smoke scenarios differ greatly, and smoke detection accuracy is not high. To resolve the foregoing existing problems and facilitate the technical solutions to a terminal device with a low computing capability in real life, the present invention provides a lightweight fire smoke detection method, a terminal device, and a storage medium. Specific embodiments are described below.

Embodiment 1

Figure 1:
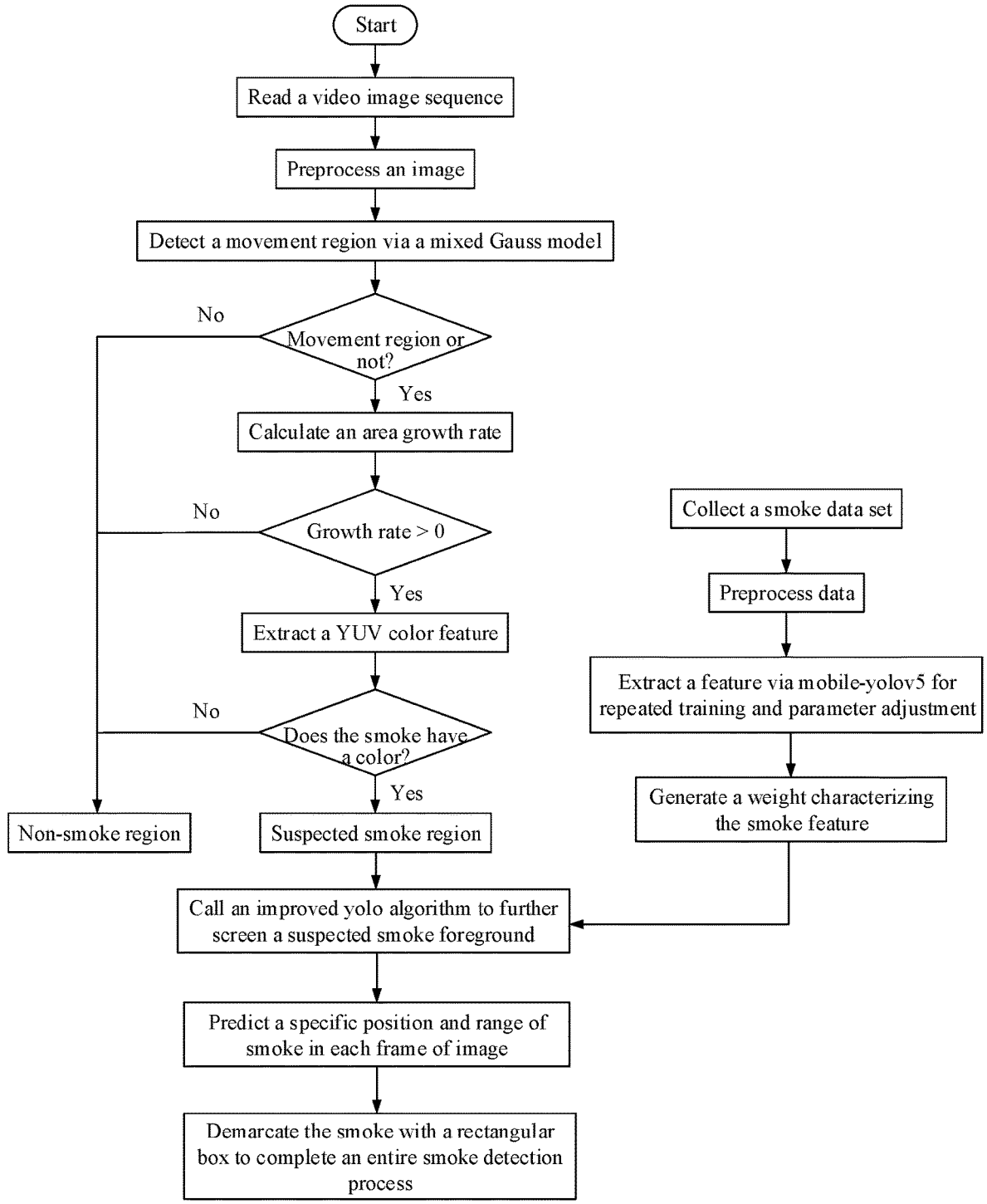
FIG. 1 is a schematic flowchart of a lightweight fire smoke detection method according to Embodiment 1 of the present invention.
Figure 2:
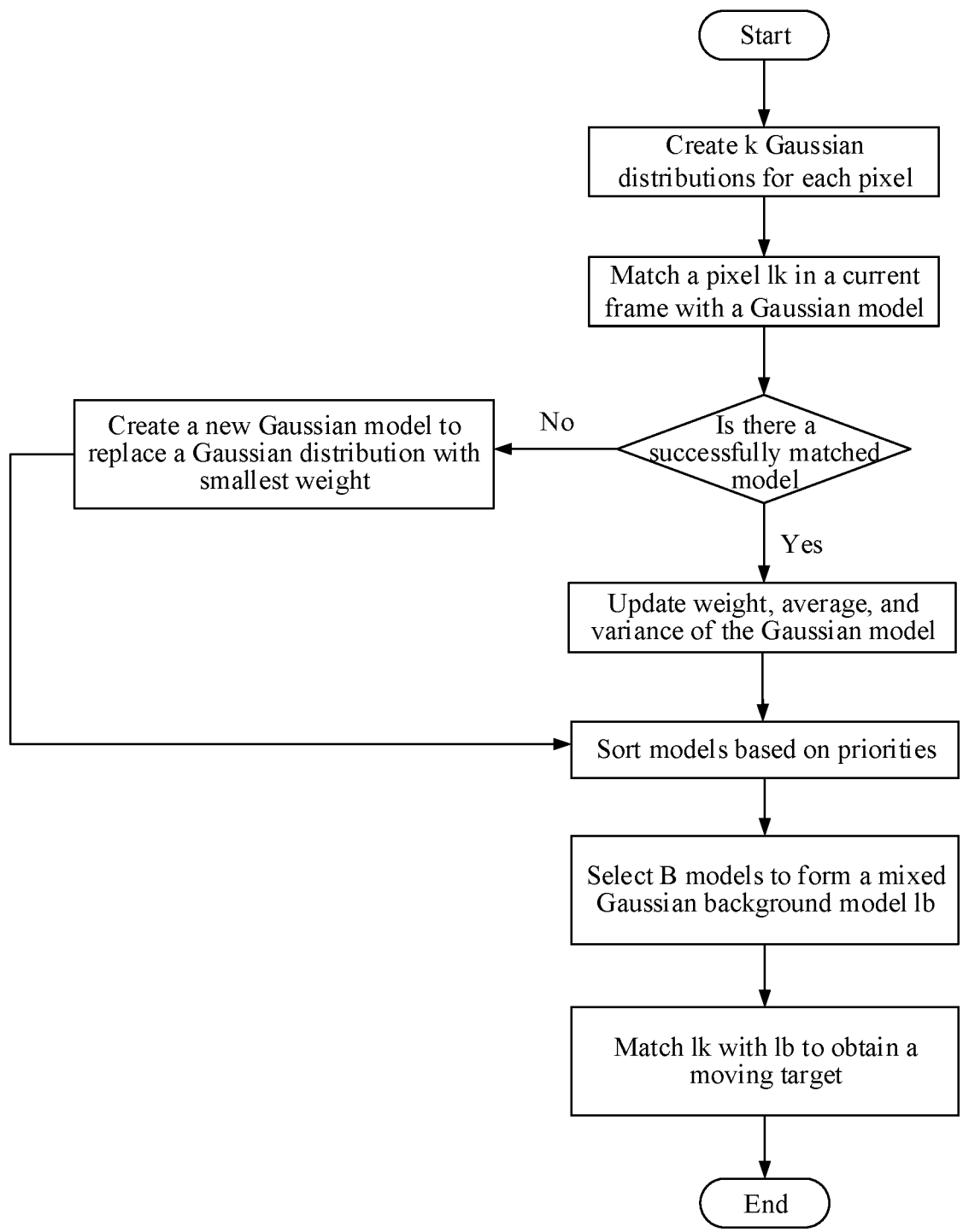
FIG. 2 is a schematic flowchart of a mixed Gaussian background modeling in a lightweight fire smoke detection method according to Embodiment 1 of the present invention.

As shown in FIG. 1, this embodiment provides a lightweight fire smoke detection method, including the following steps:

1.1. Extraction of a Dynamic Foreground Via Mixed Gauss:

When a color image is being processed, in the mixed Gaussian background modeling, it is believed that the R, G, and B three-color channels of image pixels are independent of each other and have the same variance. Pixel information of a pixel X in different images is a value of the pixel at a moment t to describe a feature of the pixel. A weighted sum of a Gaussian distribution probability density function is expressed in a formula (1-1).

$$P(x_t) = \sum_{i=1}^{k} w_{i,t} \cdot \eta(x_t, \mu_{i,t}, \tau_{i,t}) \qquad (1-1)$$

$$\eta(x_t, \mu_{i,t}, \tau_{i,t}) = \frac{1}{|\tau_{i,t}|^{1/2}} e^{-\frac{1}{2}(x_t-\mu_{i,t})^T \tau^{-1}(x_t-\mu_{i,t})}$$

$$\tau_{i,t} = \sigma_{i,t}^2 I$$

where $x_t$ is a pixel in a current frame, k is the total number of Gaussian models, $w_{i,t}$ is weight of the $i^{th}$ Gaussian distribution at a moment t, $\eta$ is a probability density function of the $i^{th}$ Gaussian distribution at the moment t, $\mu_{i,t}$ and $\tau_{i,t}$ are a mean and a covariance matrix, $\sigma_{i,t}^2$ is a variance, and I is a three-dimensional identity matrix. FIG. 2 is a flowchart of mixed Gaussian background modeling.

(1) Match pixels in the current frame with preset mixed Gaussian models one by one until the Gaussian model that suits the pixel is found, as shown in formula (1-2).

$$|x_t - \mu_{i,t-1}| \leq D \cdot \sigma_{i,t-1} \qquad (1-2)$$

where D is a confidence parameter and usually has a value set to 2.5, and $\sigma_{i,t-1}$ is a standard deviation of the $i^{th}$ Gaussian distribution at the moment t−1.

(2) If a Gaussian distribution matches the pixel successfully, set $M_{i,t}$ to 1, and update a parameter in the Gaussian model, as expressed in the following formula (1-3):

$$w_{i,t} = (1-\alpha)w_{i,t-1} + \alpha M_{i,t}$$

$$\mu_{i,t} = (1-\rho)\mu_{i,t-1} + \rho x_t$$

$$\sigma_{i,t}^2 = (1-\rho)\sigma_{i,t-1}^2 + \rho(x_t - \mu_{i,t})^T(x_t - \mu_{i,t}) \qquad (1-3)$$

where $\alpha$ is a learning rate, and $\rho = \alpha \cdot \eta$, which is a parameter update rate.

(3) If the Gaussian distribution does not match the pixel, keep the mean $\mu_{i,t}$ and variance $\sigma_{i,t}^2$ in Gaussian distribution parameters unchanged, and only change the weight $\sigma_{i,t}$, where $M_{i,t}$ is 0 in this case. When none of k Gaussian distributions matches the pixel, a new Gaussian distribution needs to be created to replace a Gaussian distribution with smaller weight in the original distributions, and normalization is performed on the parameters.

(4) Sort the Gaussian distributions based on values of the formula $\lambda_{i,t} = w_{i,t}/\sigma_{i,t}$, where a model with higher ranking has a greater weight and more matches with the pixels, meaning that the model is more stable; and choose B Gaussian models to describe the scenario information. $x_t$ is matched with the obtained B Gaussian models, and when one model satisfies a need of the pixel, the pixel is treated as the background, otherwise, the pixel is treated as the foreground, as expressed in formula (1-4).

$$B = \arg \min_{b} \left( \sum_{i=1}^{b} w_{i,t} > T \right) \qquad (1-4)$$

where b is an initial parameter, and T is a preset threshold.

1.2. Features of Smoke Growth

Figure 3:
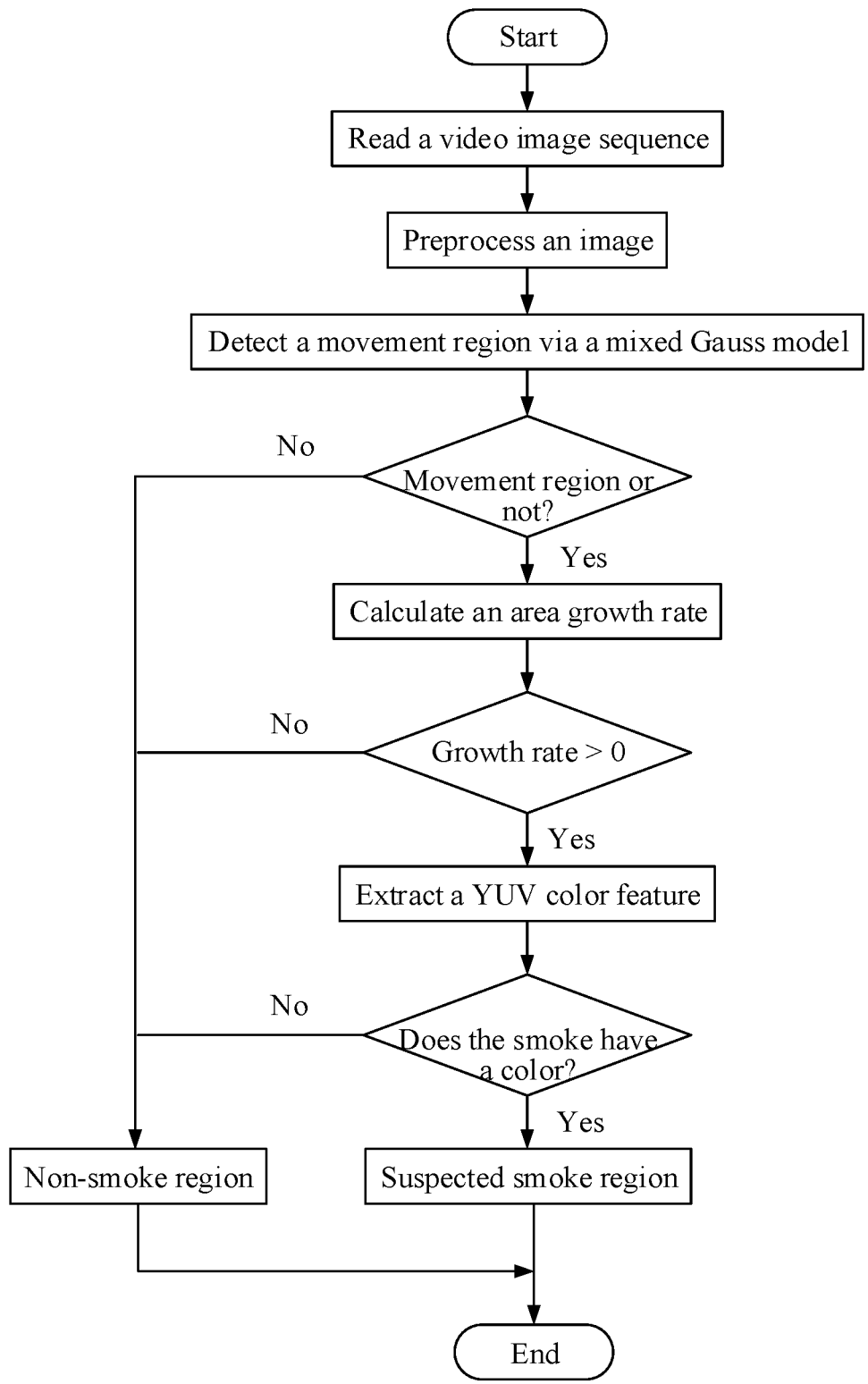
FIG. 3 is a flowchart of extraction of a smoke-like region in a lightweight fire smoke detection method according to Embodiment 1 of the present invention.

The smoke movement is characterized by growth and diffusion. Specifically, as shown in FIG. 3, the longer the time, the larger the area of the smoke region in the continuous video image sequence.

(1) Calculate an area growth rate of the smoke region by using a formula (1-5):

$$\varphi = \frac{S_t - S_{t_0}}{t - t_0} \qquad (1-5)$$

In the formula, $S_{t_0}$ is an area of a movement region at a moment $t_0$; and $t-t_0$ is a time interval.

(2) If it is determined that the area growth rate is greater than 0, determine that the image has a feature similar to smoke movement, and keep the image for the next step.

(3) If it is determined that the area growth rate is less than or equal to 0, discard the image.

1.3. YUV Smoke Color Features for Smoke-Like Screening

In RGB and HSI color space, a classification result of a suspected smoke pixel depends on background lighting and an environmental condition. In the YUV color space, Y is a luminance (Luminance or Luma) component, that is, a grayscale value; and U and V are chrominance (Chrominance or Chroma) components, which are used to describe a color and saturation of the image. In the YUV color space, a luminance signal Y is independent of the chrominance signals U and V, and color information is not sensitive to an illumination change. Therefore, in this specification, a smoke color detection method based on the YUV color space is used.

(1) A formula for switching from the RGB color space to the YUV color space is as follows:

$$Y=0.299R+0.587G+0.114B$$

$$U=-0.1687R-0.3313G+0.5B+128$$

$$V=0.5R-0.4187G-0.813B+128 \quad (1-6)$$

where a value range of Y is 0 to 255, and value ranges of chrominance components U and V are also 0 to 255.

Usually, at low temperature, the color of the smoke changes from bluish white to white, and as the temperature rises, the smoke becomes gray black and black again. To explain this phenomenon clearly, the inventors select some sample images and extract Y, U, and V components of an input RGB image respectively. After a lot of smoke image experiments, it can be seen that |U–V| values of smoke pixels are mainly between 70 and 160. The color of the smoke depends on the pixel (1-7):

$$I_{color} = \begin{cases} I(x, y) & U(x, y) > T_U \text{ OR } |U(x, y) - V(x, y)| > T_{UV} \\ 0 & \text{Others} \end{cases} \quad (1-7)$$

where U(x,y) and V(x,y) are a component U and a component V of a point (x,y) respectively. After a lot of experiments, the thresholds $T_U$ and $T_{UV}$ are set to 140 and 70 respectively.

(2) A region that satisfies the formula 1-7 is determined as a smoke-like region.

Step 2: During extraction of a smoke feature, use a preprocessed smoke data set as input of the model, repeatedly train and adjust a parameter in a mobile-yolov5 model, to finally generate a weight characterizing the smoke feature, and call the weight for the smoke foreground obtained by coarse screening, to perform secondary fine screening on the smoke region.

Figure 4:
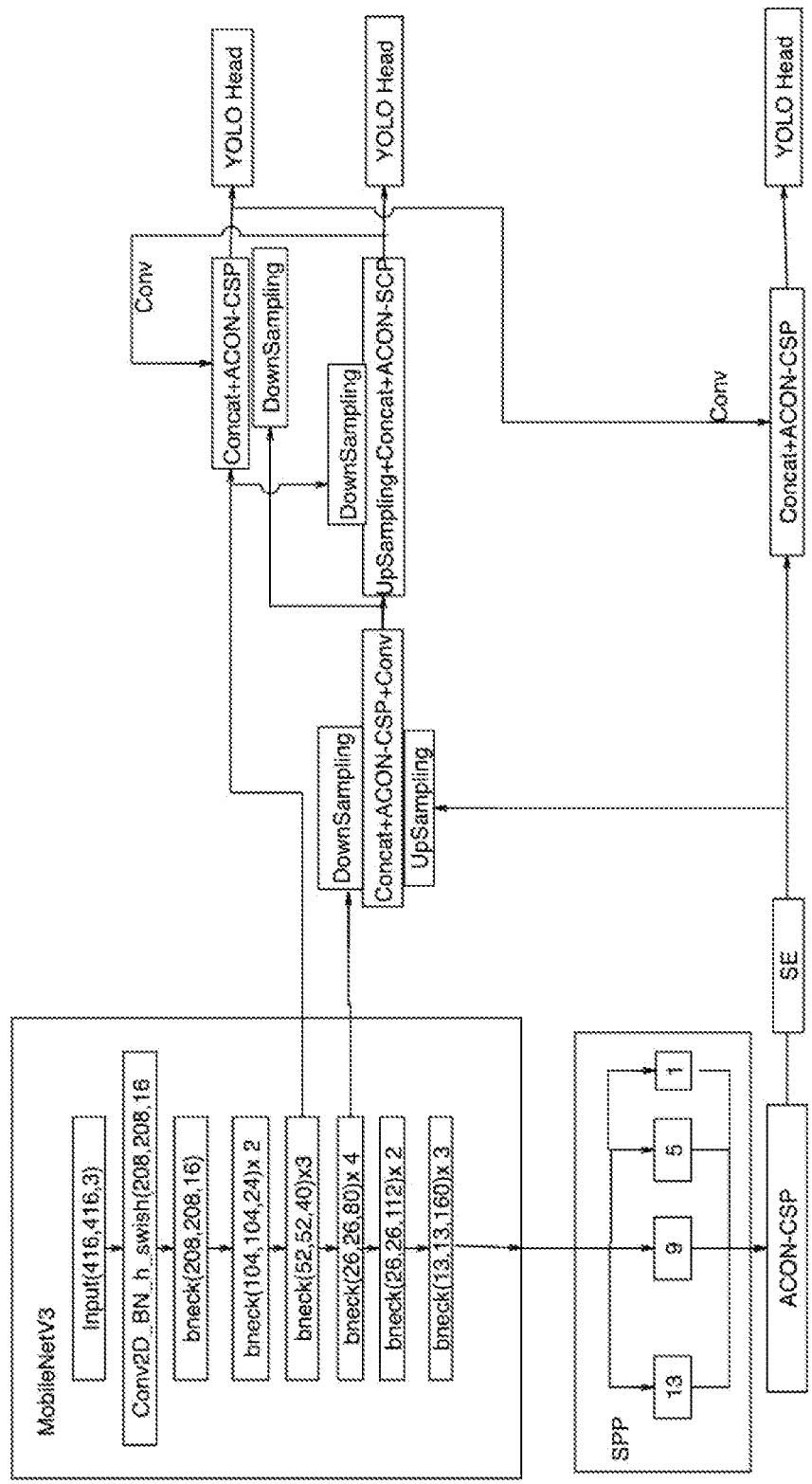
FIG. 4 is a schematic structural diagram of a mobile-yolov5 algorithm according to Embodiment 1 of the present invention.
Figure 5:
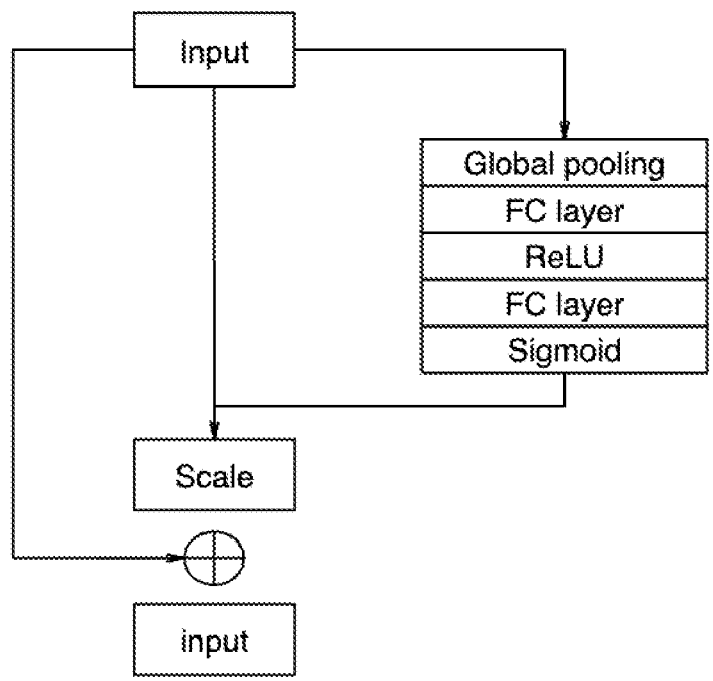
FIG. 5 is a schematic diagram of an SE module according to Embodiment 1 of the present invention.
Figure 6:
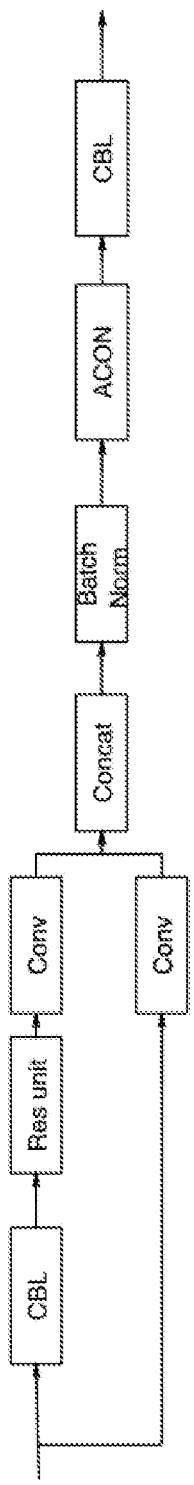
FIG. 6 is a schematic diagram of an ACON-CSP module according to Embodiment 1 of the present invention.

Improvements to an extraction backbone network:

As shown in FIG. 4 to FIG. 6, a backbone network of YOLOv5s is replaced with a backbone network of Mobilenetv3 for feature extraction. In addition, to improve the accuracy, an SE attention mechanism is added to a backbone network of mobile-yolov5 to enhance semantic information of each channel after convolution. Then, an ACON activation function is introduced to replace a Leaky ReLU activation function of YOLOv5. An ACON-CSP module mainly extracts a feature from a feature map and extracts rich information from the image. Compared with other large-scale convolutional neural networks, the ACON-CSP structure can reduce repetition of gradient information in an optimization process. The ACON activation function can adaptively choose whether to activate neurons. By replacing the activation layer of the original network, the network precision can be improved.

As a representative of lightweight networks, MobileNet series networks are widely used in embedded and mobile terminals. As the newest version of MobileNet series, MobileNetv3 combines the following four features.

1. For depth-separable convolution of MobileNetV1, depth-separable convolution is introduced to replace ordinary convolution with depth convolution and point convolution. For the depth convolution, a different convolution kernel is used for each input channel, that is, the number of groups in the network is equal to the number of channels in the network, so that calculation of the network is reduced to the minimum and channels are fused by the point convolution. Through the depth-separable convolution, not only good accuracy is maintained, but also calculation is greatly reduced.

2. MobileNetV2 has a linear bottleneck inverse residual structure. The linear bottleneck inverse residual structure of MobileNetV2 is different from the original residual structure. For the original residual structure, a method of first reducing a dimension and then increasing the dimension is used. For the depth convolution, because there are a few parameters, a few features are extracted. If compression is first performed, fewer features are extracted, and therefore, expansion is first performed to extract the feature and then compression is performed. In addition, the feature obtained by the depth-separable convolution corresponds to low-dimensional space. If linear mapping is used subsequently, most features can be retained; or if nonlinear mapping is used, the feature is damaged, which deteriorates a model effect. Therefore, the last ReLU6 layer in each block is switched to linear mapping, to reduce loss of the feature and obtain a better detection result.

3. A lightweight attention model is introduced. As shown in FIG. 5, the lightweight attention mechanism, namely, a SENet network, is introduced. The attention network SENet performs global average pooling on each channel, so that each channel has a global receptive field and a shallow network also has global information. Then corresponding weight is generated for each channel through FC→Relu→FC→h-swish, to enhance an important feature and suppress an unimportant feature.

4. A swish function is replaced with an h-swish function, and the h-swish function is an improvement based on the swish function. The swish function has features of possession of a lower bound but no upper bound, smoothness, and non-monotonicity, and has a better effect than ReLU in a depth model. But a sigmoid function $\sigma(x)$ of the swish function consumes a lot of computing resources on a mobile end. To apply the swish function on a mobile device and reduce the computing resources consumed for the swish function, the h-swish function uses a similar ReLU6 function of the sigmoid function $\sigma(x)$ to simulate the swish function. In a quantification mode, efficiency can be increased by about 15% by using ReLU6, and the ReLU6 function has been implemented in many software and hardware frameworks, is easy to quantify and deploy, and has high calculation and reasoning speeds.

A YOLOv5 algorithm is developed on the basis of YOLOv4 and YOLOv3. A structure of YOLOv5 is about 90% smaller than YOLOv4. YOLOv5 has better accuracy than existing YOLOv3 and YOLOv4 algorithms. The YOLOv5 structure is divided into four parts: an input end, a backbone, a neck, and prediction. The input end includes Mosaic data enhancement, adaptive image scaling, and adaptive anchor box calculation, the backbone includes a focus structure and a CSP structure, the neck includes an FPN+PAN structure, and the prediction includes a GIOU Loss structure.

The SPP (Spatial Pyramid Pooling) module uses four convolution kernels of different sizes separately to perform maximum pooling processing on a feature of the front layer. The sizes of the convolution kernels are 13×13, 9×9, 5×5, and 1×1 respectively, and then four processed results are connected to form a new feature layer, and the feature of the previous layer is retained while network depth increased to obtain more partial feature information.

A PANet module samples a feature extraction result of the MobileNetV3 backbone network first upwards and then downwards, which enhances an information extraction capability of a feature pyramid. Through adaptive pooling of different layers, a feature grid is directly fused with all feature layers, and a fusion result is transmitted to the head during the downward sampling process, to perform regression and classification. Prediction results of three feature layers are obtained through the PANet structure, and sizes of the three feature layers are 52×52, 26×26, and 13×13 respectively.

The Yolo head divides the input image into a network of a corresponding size. For example, a 13×13 feature layer is divided into a 13×13 grid. A grid in which a target center is located is responsible for prediction of the target. Each grid point has 3 preset apriori boxes, and sizes of the apriori boxes of grid points of feature layers of different sizes are also different. Each preset apriori box is predicted to obtain offset x_offset and y_offset of a grid center, width w and height h of the prediction box, and confidence and classification results of an object. In the prediction process, offset is added to each grid, to obtain a center of the prediction box, and then a position of the prediction box can be obtained through the apriori box with reference to h and w.

In the model in this embodiment, all standard convolutions with a 3×3 convolution kernel are replaced with depth-separable convolutions, which further reduces the number of model parameters.

In the smoke detection in this embodiment, some smoke candidate regions are firstly generated, then category scores are obtained through a classification network, more accurate position parameters are further obtained through a regression network at the same time, and finally, a final detection result is obtained through non-maximum value suppression. The backbone network of YOLOv5s network is replaced with the backbone network of Mobilenetv3 with fewer parameters, to perform feature extraction, which reduces calculation. In addition, to improve the accuracy, an SE attention mechanism is added to a backbone network of mobile-yolov5 to enhance semantic information of each channel after convolution. Then, an ACON activation function is introduced to replace a Leaky ReLU activation function of YOLOv5, to form the ACON-CSP module. The ACON-CSP module mainly extracts a feature from a feature map and extracts rich information from the image. Compared with other large-scale convolutional neural networks, the ACON-CSP structure can reduce repetition of gradient information in an optimization process, and adaptively choose whether to activate neurons, to improve network precision. In addition, the smoke foreground is extracted for preprocessing by using the combination of the mixed Gaussian and YUV, and in this way, not only static interference and non-smoke color interference in the preprocessing stage are ruled out, but also the range of the smoke detection is reduced, thereby ensuring the relative accuracy and improving the detection speed, which provides a possible method for fire smoke detection of a terminal device with a lower capability in an outdoor computer.

Embodiment 2

This embodiment provides a terminal device, including a memory, a processor, and a computer program stored in the memory and capable of running on the processor, where when the processor executes the computer program, the method in Embodiment 1 is implemented. The terminal device has a corresponding functional module for executing the method and a beneficial effect. For details not described in this embodiment, refer to Embodiment 1.

Embodiment 3

This embodiment provides a computer-readable storage medium. The computer-readable storage medium stores a computer program, and when the computer program is executed by a processor, the method in Embodiment 1 is implemented.

A person skilled in the art should understand that the embodiments of this application may be provided as a method, an apparatus, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (apparatus), and the computer program product according to the embodiments of this application. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The foregoing descriptions are merely example implementations of the present invention. It should be noted that a person of ordinary skill in the art may make several improvements or variations without departing from the technical principle of the present invention and the improvements or variations shall also fall within the protection scope of the present invention.

What is claimed is:

1. A lightweight fire smoke detection method, comprising the following steps:
   obtaining a video image;
   screening out a smoke-like foreground based on a combination of a mixed Gaussian model and a YUV color model;
   calling an improved yolo algorithm to further screen the smoke-like foreground; and
   predicting a specific position and range of smoke in each frame of image to complete a smoke detection process;
   wherein the screening out a smoke-like foreground based on a combination of a mixed Gaussian model and a YUV color model specifically comprises:
   performing pixel matching on each frame of video by using a mixed Gauss algorithm, to obtain a corresponding static background and dynamic foreground; and
   determining an area growth rate of the dynamic foreground, and if the area growth rate is greater than 0, extracting the dynamic foreground again based on the YUV color model, to obtain a smoke foreground obtained via coarse screening to finally demarcate a specific position and range of smoke in the video;
   wherein during the performing pixel matching on each frame of video by using a mixed Gauss algorithm, a weighted sum formula of a Gaussian distribution probability density function is:

$$P(x_t) = \sum_{i=1}^{k} w_{i,t} \cdot \eta(x_t, \mu_{i,t}, \tau_{i,t}) \quad (1\text{-}1)$$

$$\eta(x_t, \mu_{i,t}, \tau_{i,t}) = \frac{1}{|\tau_{i,t}|^{1/2}} e^{-\frac{1}{2}(x_t-\mu_{i,t})^T \tau^{-1}(x_t-\mu_{i,t})}$$

$$\tau_{i,t} = \sigma_{i,t}^2 I$$

wherein $x_t$ is a pixel in a current frame, k is the total number of Gaussian models, $w_{i,t}$ is weight of the $i^{th}$ Gaussian distribution at a moment t, $\eta$ is a probability density function of the $i^{th}$ Gaussian distribution at the moment t, $\mu_{i,t}$ and $\tau_{i,t}$ are a mean and a covariance matrix, $\sigma_{i,t}^2$ is a variance, and I is a three-dimensional identity matrix;
matching pixels in the current frame with preset mixed Gaussian models one by one until the Gaussian model that suits the pixel is found, as expressed in the following formula:

$$|x_t-\mu_{i,t}| \le D \cdot \sigma_{i,t} \quad (1\text{-}2)$$

wherein D is a confidence parameter and $\sigma_{i,t}$ is a standard deviation of the $i^{th}$ Gaussian distribution at the moment t−1; and
if a Gaussian distribution matches the pixel successfully, setting $M_{i,t}$ to 1, and updating a parameter in the Gaussian model, as expressed in the following formula:

$$w_{i,t}=(1-\alpha)w_{i,t-1}+\alpha M_{i,t}$$

$$\mu_{i,t}=1-\rho)\mu_{i,t-1}+\rho x_t$$

$$\sigma_{i,t}^2=(1-\rho)\sigma_{i,t-1}^2+\rho(x_t-\mu_{i,t})^T(x_t-\mu_{i,t}) \quad (1\_3)$$

wherein $\alpha$ is a learning rate and $\rho=\alpha\cdot\eta$ is a parameter update rate; or
if the Gaussian distribution does not match the pixel, keeping the mean $\mu_{i,t}$ and variance $\sigma_{i,t}^2$ in Gaussian distribution parameters unchanged, and only changing the weight $w_{i,t}$, wherein $M_{i,t}$ is 0 in this case; and when none of k Gaussian distributions matches the pixel, creating a new Gaussian distribution to replace a Gaussian distribution with smaller weight in the original distributions, and performing normalization on the parameters; and
matching $x_t$ with the obtained B Gaussian models, and when one model satisfies a need of the pixel, treating the pixel as the background, otherwise, treating the pixel as the foreground, as expressed in the following formula:

$$B = \arg\min_b \left(\sum_{i=1}^{b} w_{i,t} > T\right) \quad (1\text{-}4)$$

wherein b is an initial parameter, and T is a preset threshold.

2. The fire smoke detection method according to claim 1, wherein during the extracting the dynamic foreground again based on the YUV color model, a formula for switching from RGB color space to YUV color space is as follows:

$$Y=0.299R+0.587G+0.114B$$

$$U=-0.1687R-0.3313G+0.5B+128$$

$$V=0.5R-0.4187G-0.813B+128 \quad (1\text{-}6)$$

wherein value ranges of Y and chrominance components U and V are all 0 to 255; and
a region that satisfies the following formula is determined as a smoke-like region:

$$I_{color} = \begin{cases} I(x,y) & U(x,y) > T_U \text{ OR } |U(x,y)-V(x,y)| > T_{UV} \\ 0 & \text{Others} \end{cases} \quad (1\text{-}7)$$

wherein $U(x,y)$ and $V(x,y)$ are a component U and a component V of a point (x,y) respectively.

3. A lightweight fire smoke detection method, comprising:
   obtaining a video image;
   screening out a smoke-like foreground based on a combination of a mixed Gaussian model and a YUV color model;
   calling an improved yolo algorithm to further screen the smoke-like foreground; and
   predicting a specific position and range of smoke in each frame of image to complete a smoke detection process;
   wherein the calling an improved yolo algorithm to further screen the smoke-like foreground specifically comprises:
   during extraction of a smoke feature, using a preprocessed smoke data set as input of the model, repeatedly training and adjusting a parameter in a mobile-yolov5 model, to finally generate a weight characterizing the smoke feature, and calling the weight for the smoke foreground obtained by coarse screening, to perform secondary fine screening on the smoke region;
   wherein in the mobile-yolov5 model, a backbone network of YOLOv5s is replaced with a backbone network of Mobilenetv3, and an SE attention mechanism is added to the backbone network of mobile-yolov5;
   introducing an ACON activation function to replace a Leaky ReLU activation function of YOLOv5 to form an ACON-CSP module for feature extraction.

4. A terminal device, comprising a memory, a processor, and a computer program stored in the memory and capable of running on the processor, wherein when the processor executes the computer program, the method according to claim 1 is implemented.

5. A non-transitory computer-readable storage medium, wherein the computer-readable storage medium stores a computer program, and when the computer program is executed by a processor, the method according to claim 1 is implemented.

* * * * *